(12) United States Patent
Meguro et al.

(10) Patent No.: US 10,310,561 B2
(45) Date of Patent: Jun. 4, 2019

(54) PORTABLE DEVICE

(71) Applicant: CASIO COMPUTER CO., LTD., Tokyo (JP)

(72) Inventors: Hiromasu Meguro, Sagamihara (JP); Yasunori Chiba, Tachikawa (JP); Shinya Okumura, Higashiyamato (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 5 days.

(21) Appl. No.: 15/662,850

(22) Filed: Jul. 28, 2017

(65) Prior Publication Data

US 2018/0074555 A1    Mar. 15, 2018

(30) Foreign Application Priority Data

Sep. 12, 2016    (JP) ................................ 2016-177593

(51) Int. Cl.
| | | |
|---|---|---|
| *G06F 1/16* | (2006.01) | |
| *G06K 7/10* | (2006.01) | |
| *H04M 1/02* | (2006.01) | |
| *H04M 1/18* | (2006.01) | |

(52) U.S. Cl.
CPC .......... *G06F 1/1656* (2013.01); *G06F 1/1626* (2013.01); *G06F 1/1635* (2013.01); *G06K 7/10722* (2013.01); *H04M 1/0202* (2013.01); *H04M 1/185* (2013.01); *G06F 2200/1633* (2013.01)

(58) Field of Classification Search
CPC .... G06F 1/1656; G06F 1/1626; G06F 1/1635; G06K 7/10722; H04M 1/0202
See application file for complete search history.

(56) References Cited

U.S. PATENT DOCUMENTS

| | | | |
|---|---|---|---|
| 2008/0146293 A1 | 6/2008 | Kim | |
| 2009/0264160 A1* | 10/2009 | Mochizuki | H04M 1/0266 455/566 |
| 2010/0315763 A1* | 12/2010 | Thelemann | H04M 1/0266 361/679.01 |
| 2012/0165081 A1 | 6/2012 | Ushigome et al. | |
| 2013/0265696 A1* | 10/2013 | Smyth | G06F 1/182 361/679.01 |
| 2016/0187714 A1 | 6/2016 | Ogatsu | |

FOREIGN PATENT DOCUMENTS

| | | |
|---|---|---|
| JP | 2000-251370 A | 9/2000 |
| JP | 2005-197192 A | 7/2005 |
| JP | 2007-273180 A | 10/2007 |
| JP | 2012-134785 A | 7/2012 |

OTHER PUBLICATIONS

Extended European Search Report dated Feb. 8, 2018 received in European Patent Application No. EP 17182982.3.

\* cited by examiner

*Primary Examiner* — Hoa C Nguyen
*Assistant Examiner* — Keith DePew
(74) *Attorney, Agent, or Firm* — Scully Scott Murphy & Presser (57) ABSTRACT

A portable device includes a device case, and an inner case arranged in the device case. The inner case includes a first frame arranged in the device case, a second frame arranged in parallel with the first frame in the device case, a coupling part configured to couple the first frame and the second frame, and a buffer member provided at the coupling part and configured to buffer shock to be applied to the first frame and the second frame.

18 Claims, 10 Drawing Sheets

PORTABLE DEVICE

CROSS-REFERENCE TO RELATED APPLICATION

This application is based upon and claims the benefit of priority from the prior Japanese Patent Application No. 2016-177593, filed on Sep. 12, 2016, the entire contents of which are incorporated herein by reference.

BACKGROUND

1. Field of the Invention

The present invention relates to a portable device such as a portable terminal, a mobile phone and the like.

2. Description of the Related Art

For example, a device case of the portable terminal is provided therein with an inner case and a variety of components are mounted to the inner case, so that the diverse components are incorporated into the device case (refer to JP 2012-134785 (A)).

SUMMARY

The portable device according to an embodiment of the present comprising: a device case, and an inner case arranged in the device case, wherein the inner case comprises: a first frame arranged in the device case, a second frame arranged in parallel with the first frame in the device case, a coupling part configured to couple the first frame and the second frame, and a buffer member provided to the coupling part and configured to buffer shock to be applied to the first frame and the second frame.

DETAILED DESCRIPTION OF EMBODIMENTS

Hereinafter, an embodiment in which the present invention is applied to a portable terminal will be described with reference to FIGS. 1 to 8.

Figure 1:
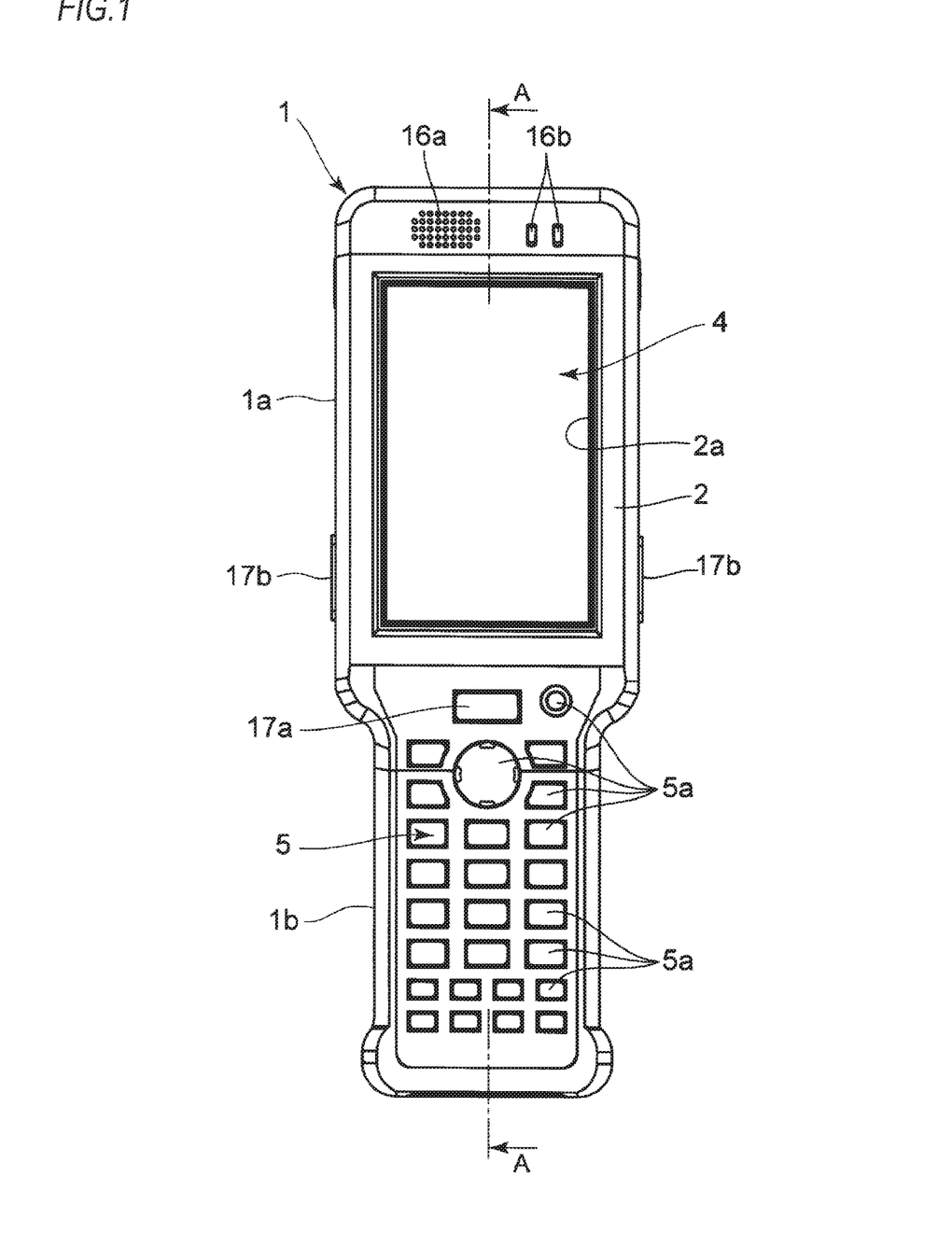
FIG. 1 is a front view depicting an embodiment in which the present invention is applied to a portable terminal.
Figure 2:
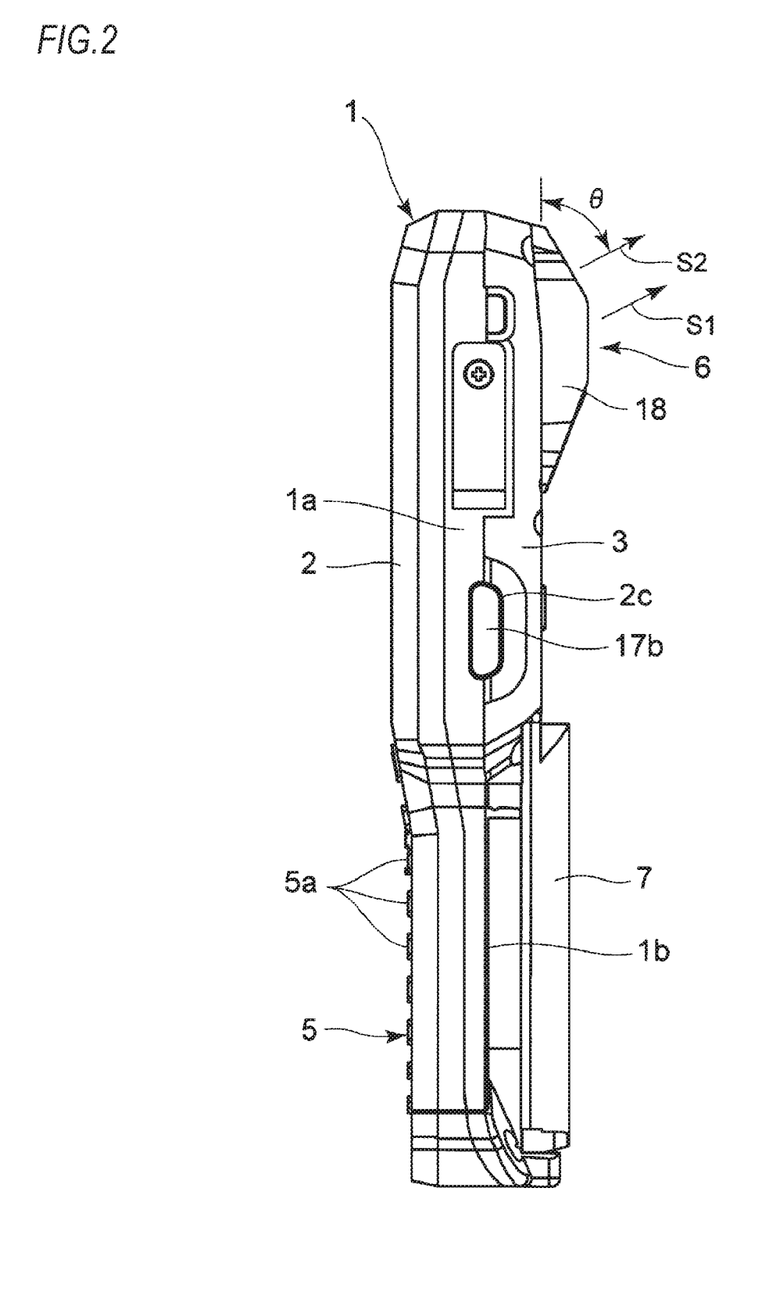
FIG. 2 is a side view of the portable terminal shown in FIG. 1.
Figure 3:
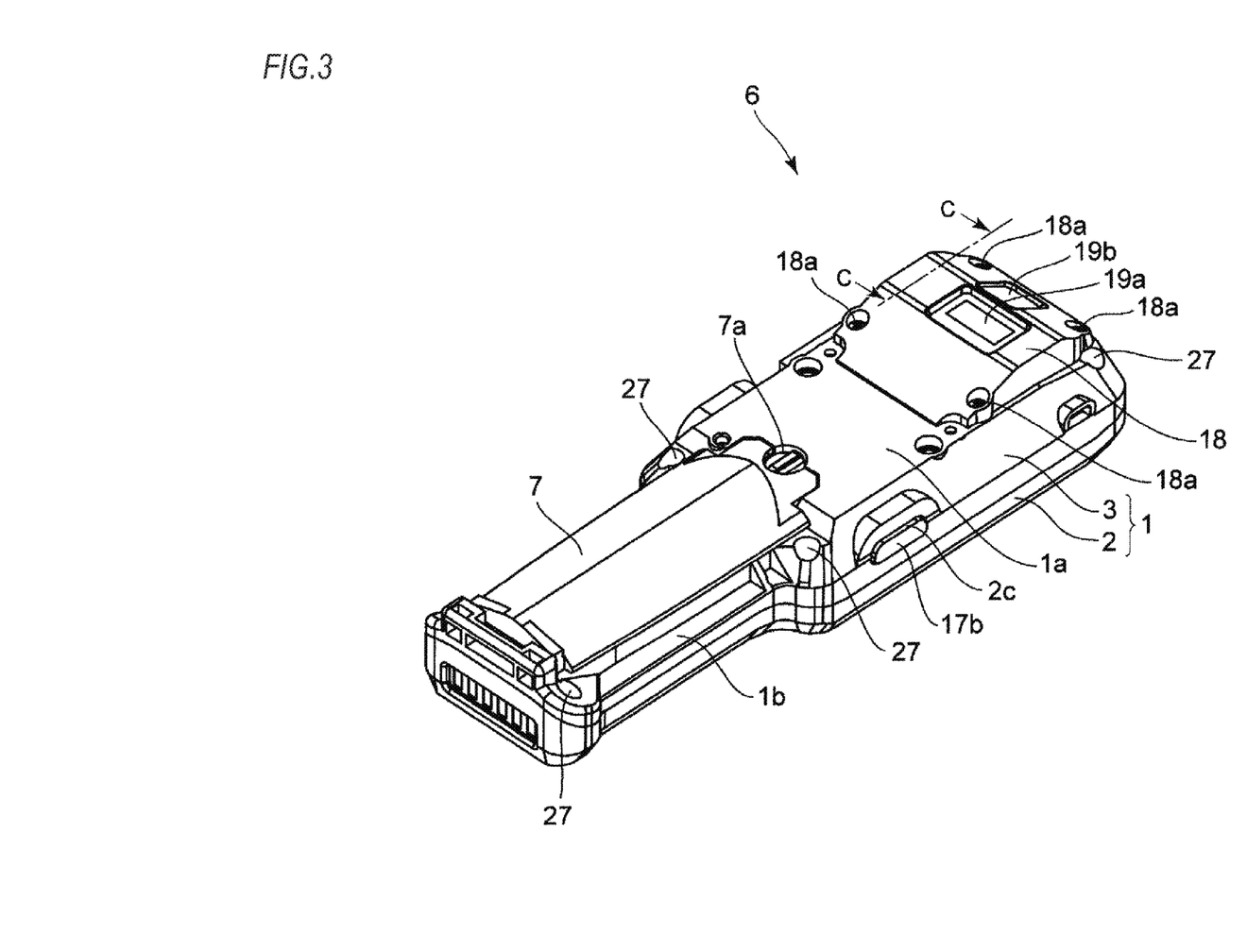
FIG. 3 is a perspective view of the portable terminal shown in FIG. 1, as seen from a back surface-side.

As shown in FIGS. 1 to 3, the portable terminal includes a device case 1. The device case 1 has an upper case 2 and a lower case 3. A display unit 4 and an input unit 5 are arranged in the upper case 2. A reading device 6 and a battery cover 7 are provided on a back surface (a front surface in FIG. 3) of the lower case 3.

In this case, as shown in FIGS. 1 to 3, the device case 1 has a configuration where a tip end portion-side (an upper part-side in FIG. 1) positioned at the display unit 4-side of the upper case 2 and the reading device 6-side of the lower case 3 corresponding to the display unit-side is formed as a rectangular main body part 1a, which is long in a front and rear direction (an upper and lower direction in FIG. 1), and a near side (a lower part-side in FIG. 1) positioned at the input unit 5-side of the upper case 2 and the battery cover 7-side of the lower case 3 corresponding to the input unit-side is formed as a rectangular gripping part 1b, which is long in the front and rear direction (the upper and lower direction in FIG. 1).

That is, as shown in FIGS. 1 to 3, the device case 1 has a configuration where a length (width) of the gripping part 1b in a direction perpendicular to a longitudinal direction of the device case 1 is shorter than a length (width) of the main body part 1a in the direction perpendicular to the longitudinal direction of the device case. Thereby, the device case 1 is entirely formed to have a substantial battledore shape. That is, the device case 1 is formed so that an area of a front surface of the main body part 1a is greater than an area of a front surface of the gripping part 1b and the gripping part 1b can be easily gripped.

As shown in FIGS. 4 to 6B, the device case 1 is provided therein with an inner case 8. The inner case 8 has a first frame 10 arranged in the main body part 1a of the device case 1, a second frame 11 arranged in parallel with the first frame 10 in the gripping part 1b of the device case 1, a coupling part 12 configured to couple the first frame 10 and the second frame 11, and a first buffer member 13 provided at the coupling part 12.

Figure 5:
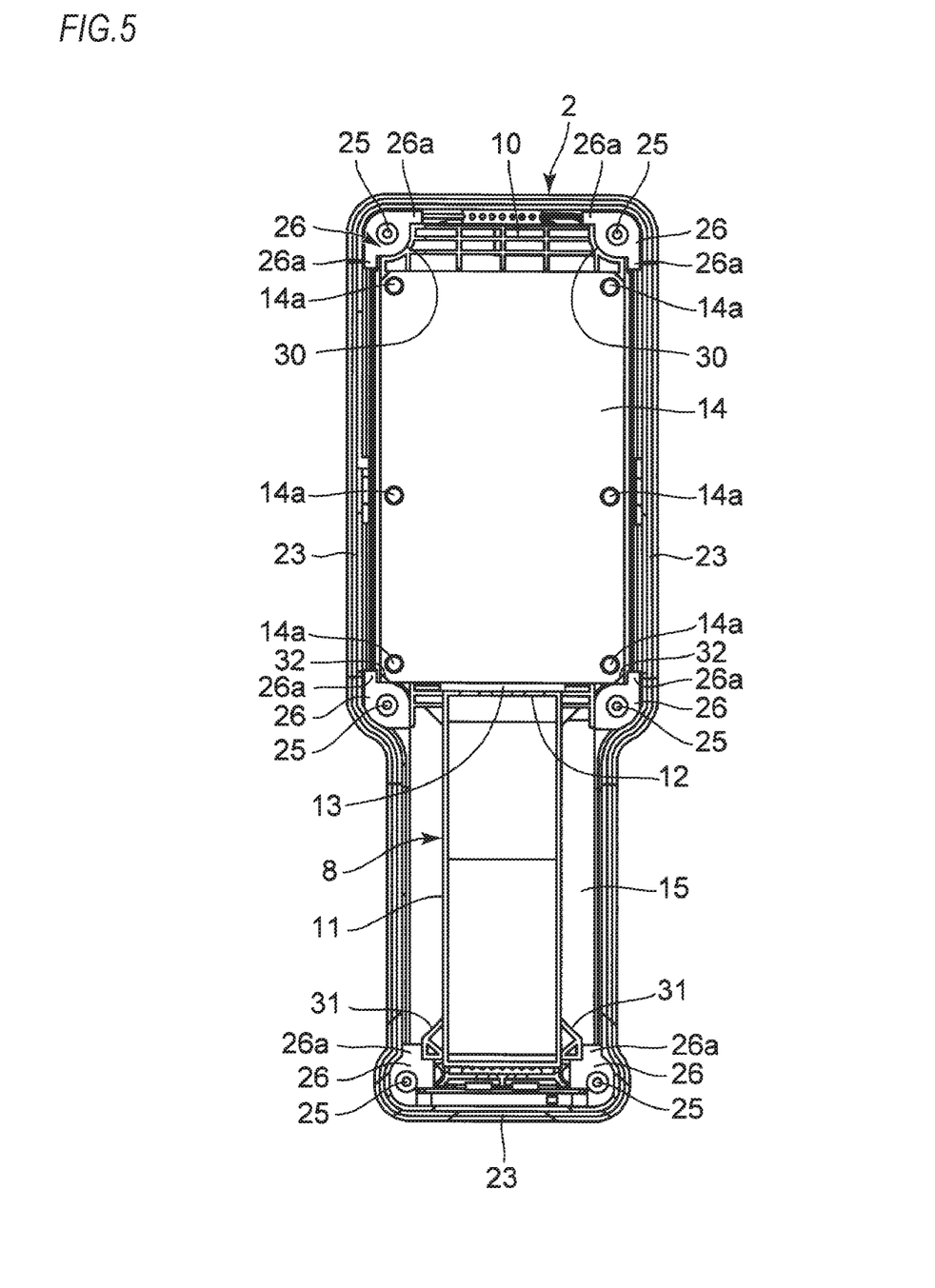
FIG. 5 is a rear view depicting a state where a lower case is detached from the portable terminal shown in FIG. 3.
Figure 6A:
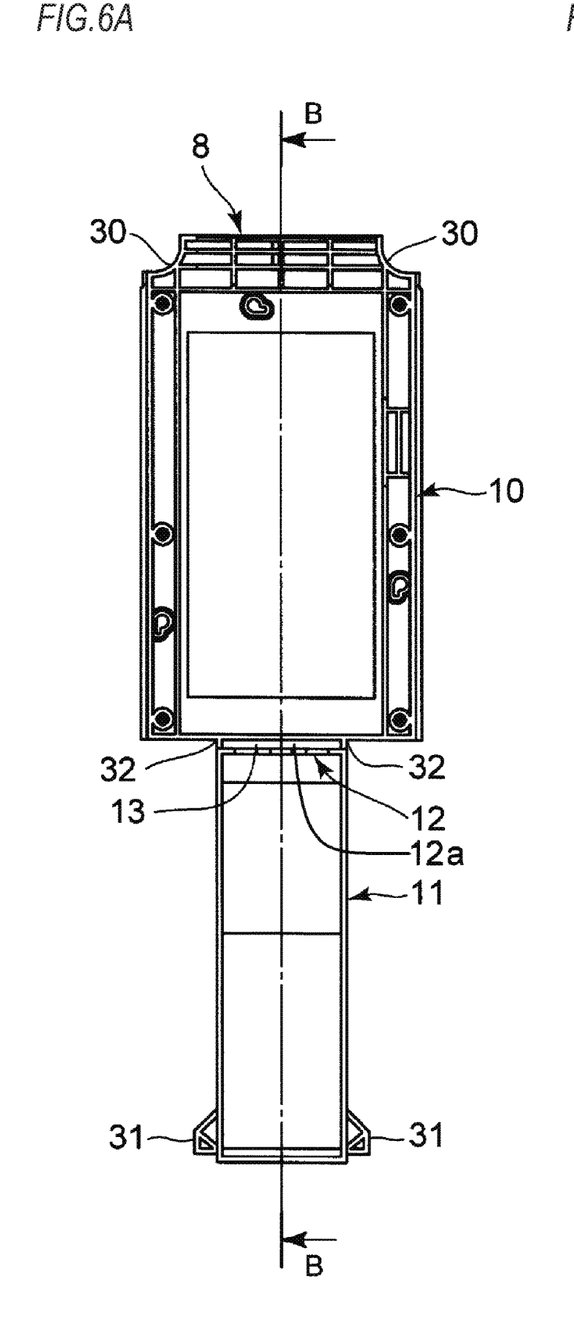
FIG. 6A is a front view of an inner case shown in FIG. 5.
Figure 6B:
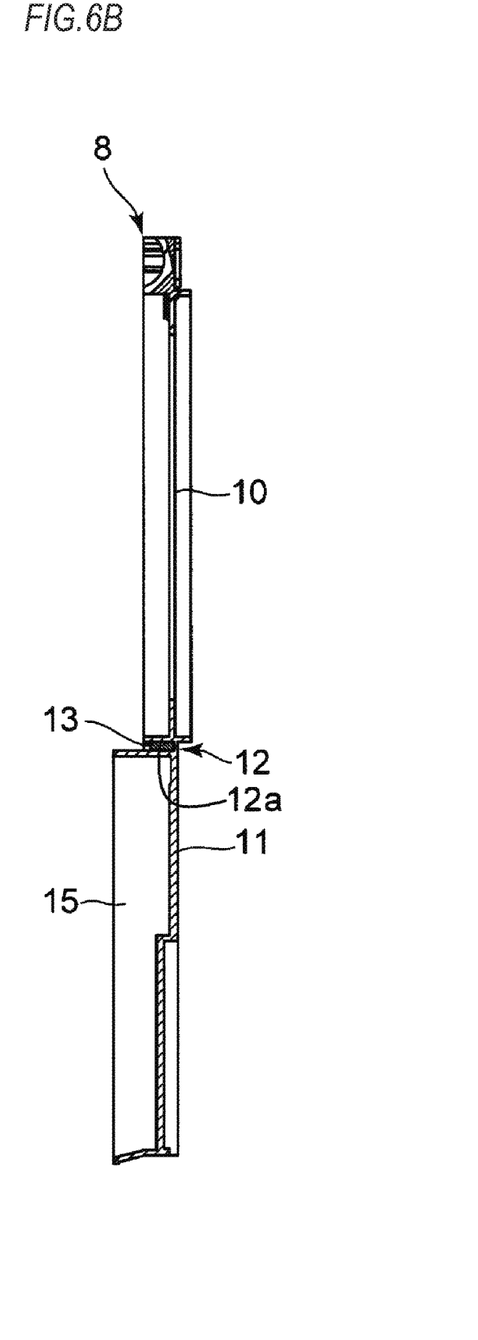
FIG. 6B is a sectional view taken along a B-B arrow direction of the inner case shown in FIG. 6A.

In this case, as shown in FIGS. 5 to 6B, the first frame 10 and the second frame 11 have a rectangular shape, respectively, and are integrally formed with the coupling part 12 by a synthetic resin such as an ABS resin, a composite material of PC (polycarbonate) resin and ABS (acrylonitrile butadiene styrene) resin, or the like. The first frame 10 has a frame shape, which is the same rectangular shape as the main body part 1a of the device case 1 and is slightly smaller than the main body part 1a.

As shown in FIGS. 5 to 6B, the second frame 11 has a bucket-like shape, which is the same rectangular shape as the gripping part 1b of the device case 1 and is slightly smaller than the gripping part 1b, i.e., a shape having a semicircular section or a trapezoidal section. A length of the second frame 11 in a direction perpendicular to a longitudinal direction of the inner case 8, which is a coupling direction in which the first frame 10 and the second frame 11 are coupled to each other, is shorter than a length of the first frame 10 in the direction perpendicular to the longitudinal direction that is the coupling direction.

As shown in FIGS. 5 to 7B, a length of the coupling part 12 in the direction perpendicular to the longitudinal direction of the inner case 8, which is the coupling direction in which the first frame 10 and the second frame 11 are coupled to each other, is substantially the same as the length of the second frame 11 in the direction perpendicular to the longitudinal direction that is the coupling direction. The coupling part 12 is formed with a slit-shaped fitting portion 12a, which is configured to fit therein the first buffer member 13 and has a length slightly smaller than the length of the second frame 11 in the direction perpendicular to the longitudinal direction.

In this case, as shown in FIGS. 6A to 7A, a length of the slit-shaped fitting portion 12a in the longitudinal direction of the inner case 8 is slightly smaller than a length of the coupling part 12 in the longitudinal direction of the inner case 8 and a length of the slit-shaped fitting portion 12a in the direction perpendicular to the longitudinal direction of the inner case 8 is slightly smaller than the length of the coupling part 12 in the direction perpendicular to the longitudinal direction of the inner case 8.

That is, as shown in FIGS. 6A to 7B, the fitting portion 12a is formed to be slightly smaller than an outward shape of the coupling part 12, except for a peripheral edge portion of the coupling part 12. Also, the fitting portion 12a has a concave shape that does not penetrate in a thickness direction, which is a front and back surface direction of the coupling part 12. That is, the fitting portion 12a is formed as a concave groove, which does not penetrate in the front and back surface direction of the inner case 8 and has a rectangular section. However, the present invention is not limited thereto. For example, the fitting portion 12a may also be formed to penetrate in the thickness direction, which is the front and back surface direction of the coupling part 12. That is, the fitting portion 12a may be formed as an opening, which penetrates in the front and back surface direction of the inner case 8 and has a rectangular section.

Figure 7A:
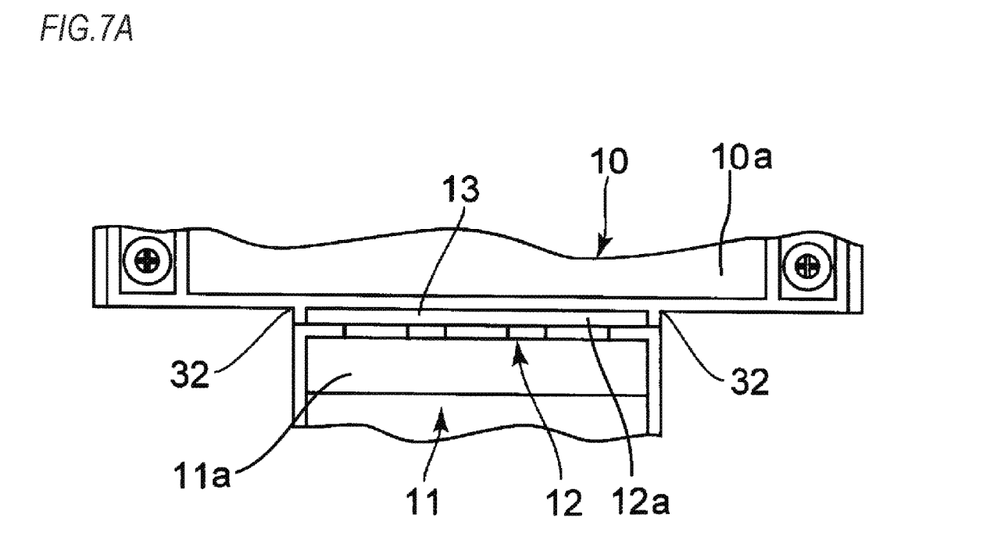
FIG. 7A is an enlarged front view depicting main parts of the inner case shown in FIG. 6A.
Figure 7B:
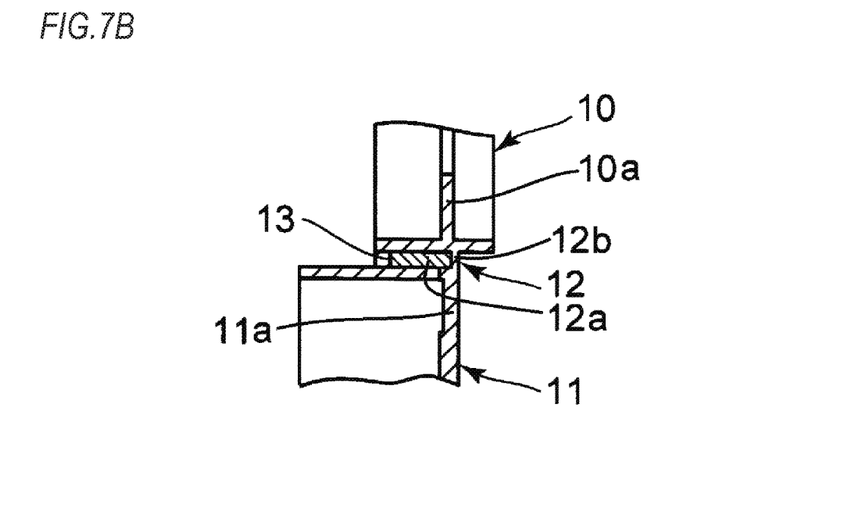
FIG. 7B is an enlarged sectional view depicting main parts of the inner case shown in FIG. 6B.

A rear wall part 12b of the fitting portion 12a is formed to be thinner than a thickness of a rear wall part 10a of the first frame 10 and/or a thickness of a rear wall part 11a of the second frame 10.

As shown in FIGS. 6A to 7B, the first buffer member 13 is formed of a synthetic resin having high resiliency and hardness of about 80 to 90 such as silicon resin, elastomer or the like. The hardness is measured by a type A durometer in accordance with JIS (Japanese Industrial Standard) K 6253. The first buffer member 13 is formed to be slightly shorter than the length of the second frame 11 in the direction perpendicular to the longitudinal direction and is configured to be fitted into the slit-shaped fitting portion 12a of the coupling part 12.

That is, as shown in FIGS. 6A to 7B, the first buffer member 13 is fitted to elastically push and enlarge the fitting portion 12a with being fitted in the slit-shaped fitting portion 12a of the coupling part 12. Thereby, when the device case 1 is applied with shock from an outside and the shock is transmitted to the inner case 8, the first buffer member 13 buffers the shock to be concentrated on the coupling part 12, thereby protecting the coupling part 12.

Figure 4:
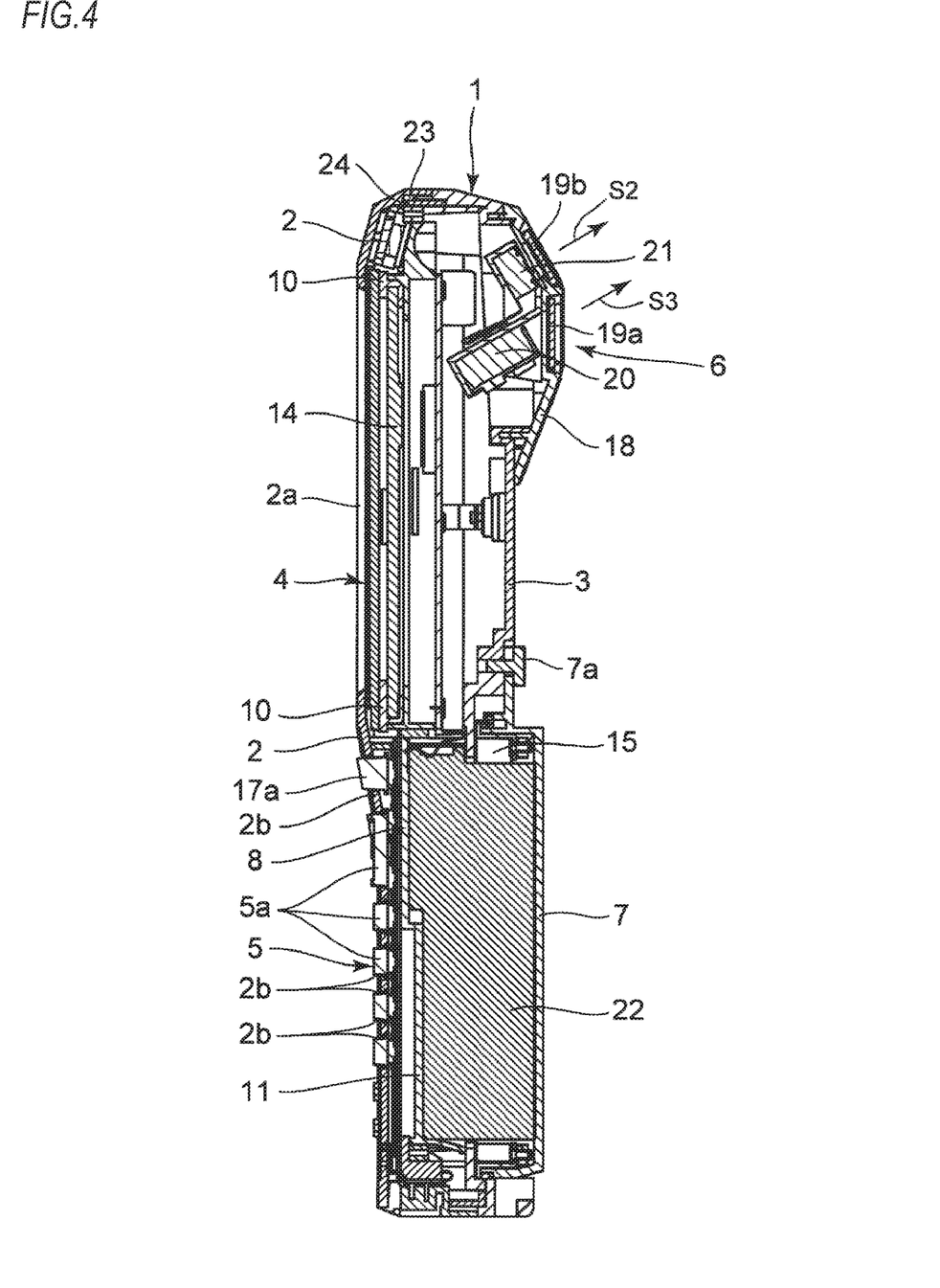
FIG. 4 is a sectional view taken along an A-A arrow direction of the portable terminal shown in FIG. 1.

In the meantime, as shown in FIG. 4, a front surface (a left surface in FIG. 4) of the first frame 10 is provided with the display unit 4. A back surface (a right surface in FIG. 4) the first frame 10 is provided with a circuit board 14. Also, a front surface (a left surface in FIG. 4) of the second frame 11 is provided with the input unit 5. A back surface (a right surface in FIG. 4) of the second frame 11 is provided with a battery accommodation part 15.

As shown in FIGS. 1 and 4, the display unit 4 has a planar display panel such as a liquid crystal display panel, an EL (electro luminescence) display panel or the like. The display unit 4 is configured to electro-optically display information on the display panel. As shown in FIG. 4, the display unit 4 is arranged in the upper case 2, in correspondence to a display opening 2a formed at a part of the upper case 2 corresponding to the main body part 1a of the device case 1.

Thereby, as shown in FIGS. 1 and 4, the display unit 4 is configured so that the displayed information can be seen through the display opening 2a from the outside of the upper case 2. In this case, as shown in FIG. 1, a part of the upper case 2 positioned at the upper part-side of the display unit 4 is provided with a speaker 16a and a light emitting element (LED) 16b for indicator.

As shown in FIGS. 4 and 5, a circuit unit configured to control the entire portable terminal is mounted the circuit board 14. The circuit board 14 is attached to the back surface (a front surface in FIG. 5) of the first frame 10 by a plurality of screws 14a. The circuit board 14 is arranged in the upper case 2 at above-described state. The circuit board 14 is electrically connected to the display unit 4, the input unit 5, the reading device 6, the speaker 16a, the light emitting element 16b and a battery 22 (which will be described later) respectively.

As shown in FIGS. 1, 2 and 4, the input unit 5 includes diverse keys 5a such as a ten key, a calculation key, a cursor key, a decision key, a battery key and the like. The input unit 5 is aligned on the upper case 2 with the diverse keys 5a being exposed outwards from a plurality of key insertion holes 2b formed in the front surface of the upper case 2. Thereby, the input unit 5 is configured to input the information by operating the diverse keys 5a.

In this case, as shown in FIGS. 1 and 2, an upper part of the input unit 5 is provided with a center trigger key 17a. The center trigger key 17a is inserted into the key insertion hole 2b formed at a substantially central portion of the upper case 2 and is exposed to a front surface-side. Also, as shown in FIGS. 2 and 3, both side surfaces of the device case 1 are provided with side trigger keys 17b, respectively. The side trigger keys 17b are inserted into key insertion holes 2c formed at both sides of the device case 1 and are exposed outwards.

As shown in FIGS. 2 to 4, the reading device 6 has a unit case 18. The unit case 18 is provided therein with a reading unit 20 and an imaging unit 21. In this case, the unit case 18 is configured to be detachably attached to a back surface (a front surface in FIG. 3) of the lower case 3 by a plurality of screws 18a.

As shown in FIG. 4, the reading unit 20 is a scanner. The reading unit 20 is configured to illuminate a light beam such as a laser light beam to an object to be read (not shown), to receive reflected light and to read code information of the object to be read. The imaging unit 21 is a camera having an imaging element. The imaging unit 21 is configured to capture the object to be read, which is to be read by the reading unit 20, as an image.

As shown in FIG. 4, the reading device 6 is configured in such a way that the code information of the object to be read, which is read by the reading unit 20, is displayed on the display unit 4 and the image of the object to be read captured by the imaging unit 21 is displayed on the display unit 4, so that it is possible to perform the reading operation by the reading unit 20 and the capturing operation by the imaging unit 21 at the same time while seeing the code information of the object to be read and the image of the object to be read displayed on the display unit 4.

As shown in FIGS. 3 and 4, the unit case 18 is formed by protruding a rectangular plate into a mountain shape gently inclined in the longitudinal direction of the device case 1. The unit case 18 is provided with a reading window part 19a corresponding to the reading unit 20 and an imaging window part 19b corresponding to the imaging unit 21. The reading unit 20 and the imaging unit 21 are set so that an illumination direction S1 of the light beam from the reading unit 20 and an imaging direction S2 of the imaging unit 21 are the same.

In this case, as shown in FIGS. 2 and 4, the reading unit 20 and the imaging unit 21 are arranged in the unit case 18 at a state where the illumination direction S1 of the light beam from the reading unit 20 and the imaging direction S2 of the imaging unit 21 are inclined relative to the back surface of the device case 1 by a predetermined angle θ. That is, the illumination direction S1 of the light beam from the reading unit 20 and the imaging direction S2 of the imaging unit 21 are preferably inclined relative to the back surface of the lower case 3 within an angle range of 40° to 80°, preferably at an angle of 60° towards a tip end-side of the lower case 3 positioned at an opposite side to the gripping part 1b.

As shown in FIGS. 4 and 5, the second frame 11 is formed with the battery accommodation part 15 having a shape of a semicircular section or a trapezoidal section convex towards a front surface thereof (a left surface in FIG. 4). The back surface (a right surface in FIG. 4) of the accommodation part 15 is opened and the battery 22 is accommodated through the opened part. The battery accommodation part 15 is arranged in the lower case 3 together with the second frame 11, and is blocked by the battery cover 7 at that state.

As shown in FIGS. 3 and 4, the battery cover 7 is configured to be detachably attached to the back surface-side (a front surface-side in FIG. 3) of the lower case 3 corresponding to the back surface-side of the input unit 5 by a screw 7a. That is, the battery cover 7 is formed to have a reverse bucket-like shape having a semicircular section and is configured to cover and block the battery accommodation part 15 in the lower case 3 with a back surface-side being convex so as to easily grip the gripping part 1b.

Figure 8:
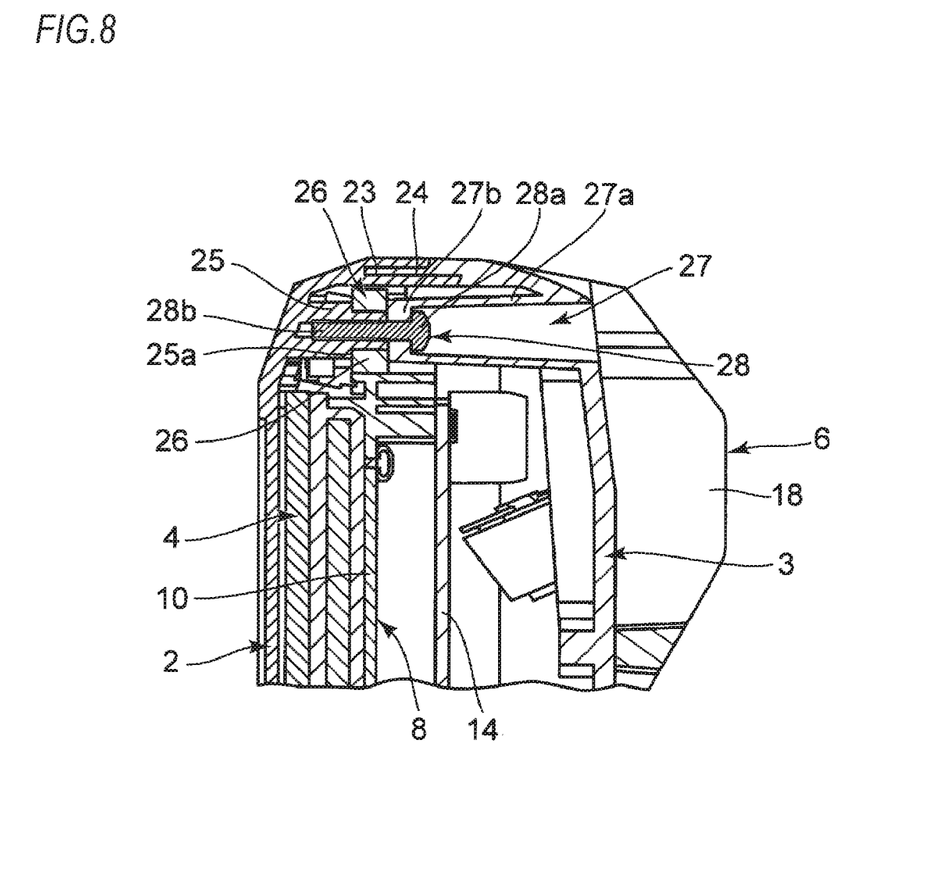
FIG. 8 is an enlarged sectional view of main parts taken along a C-C arrow direction of the portable terminal shown in FIG. 3.
Figure 9A:
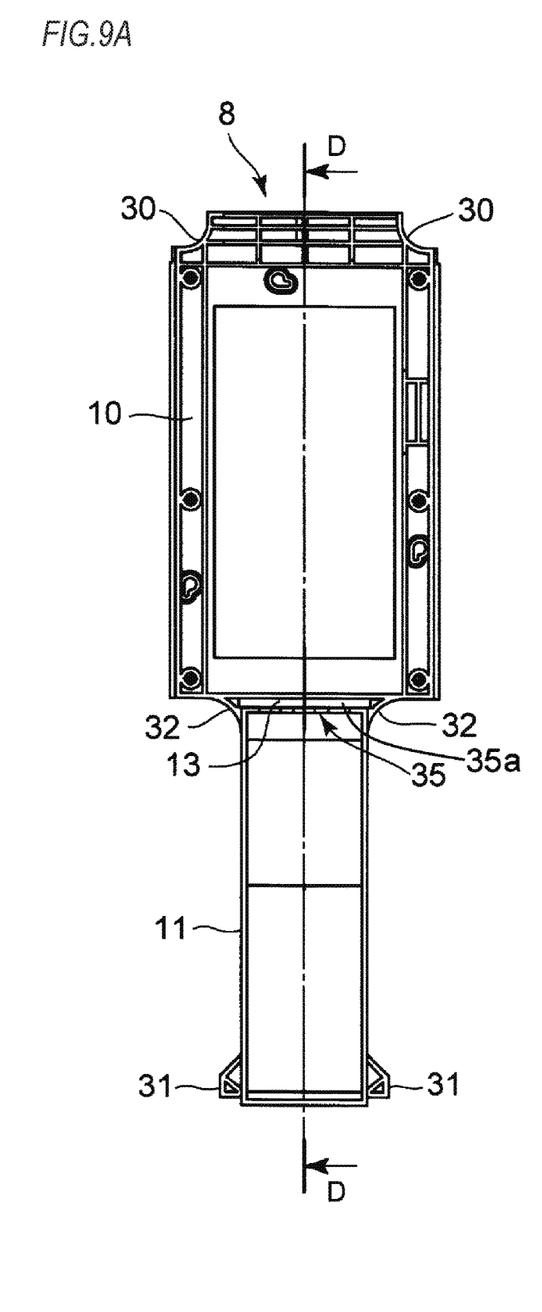
FIG. 9A is a front view of an inner case in accordance with a modified embodiment of the inner case shown in FIG. 5.
Figure 9B:
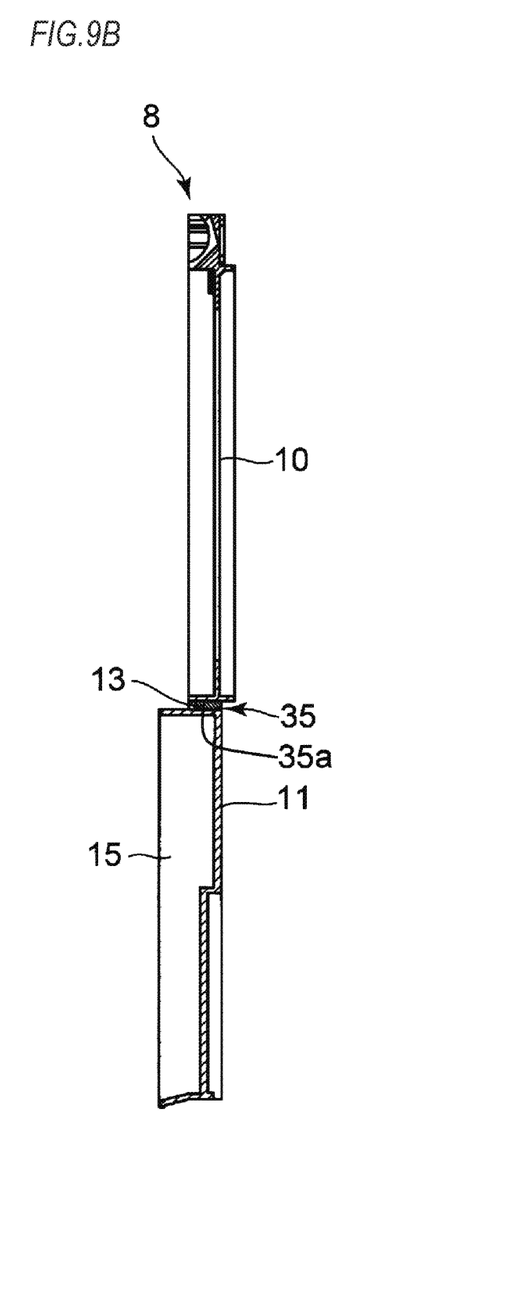
FIG. 9B is a sectional view taken along a D-D arrow direction of the inner case shown in FIG. 9A.
Figure 10A:
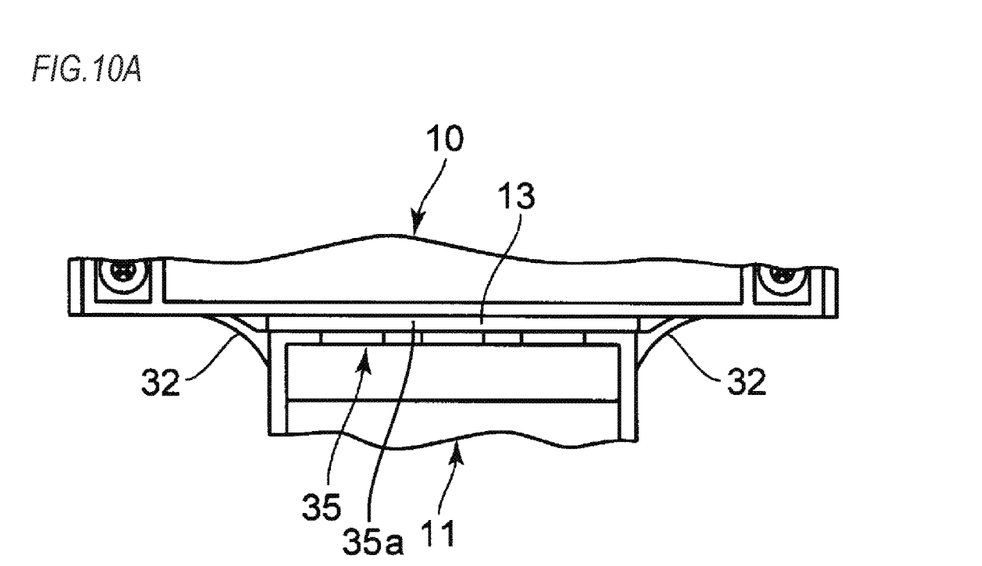
FIG. 10A is an enlarged front view depicting main parts of the inner case shown in FIG. 9A.
Figure 10B:
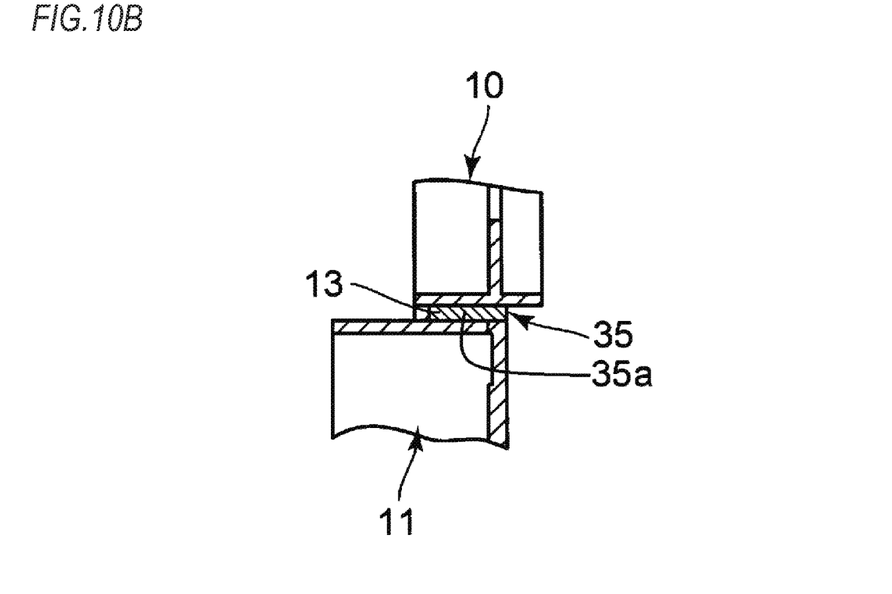
FIG. 10B is an enlarged sectional view depicting main parts of the inner case shown in FIG. 9B.

As shown in FIG. 8, the device case 1 is configured so that when the upper case 2 and the lower case 3 are superimposed, an engaging protrusion 24 provided at an upper peripheral edge portion (a left peripheral edge portion in FIG. 8) of the lower case 3 is engaged with an engaging groove 23 provided at a lower peripheral edge portion (a right peripheral edge portion in FIG. 8) of the upper case 2 and the upper case 2 and the lower case 3 are thus coupled.

That is, as shown in FIGS. 5 and 8, the engaging groove 23 of the upper case 2 is formed along an outer periphery of an inner lower part (a front surface part in FIG. 5) of the upper case 2. As shown in FIG. 8, the engaging protrusion 24 of the lower case 3 is formed along an outer periphery of an inner upper part of the lower case 3. Thereby, the device case 1 is configured so that when the upper case 2 and the lower case 3 are superimposed, the engaging protrusion 24 of the lower case 3 is fitted into the engaging groove 23 of the upper case 2 and the upper case 2 and the lower case 3 are thus coupled.

Also, as shown in FIGS. 5 and 8, the device case 1 has a plurality of coupling boss parts 25 and a plurality of second buffer members 26. The plurality of coupling boss parts 25 are provided at the upper case 2 of the upper case 2 and the lower case 3 and configured to couple the upper case 2 and the lower case 3. The plurality of second buffer members 26 are provided around the plurality of coupling boss parts 25 and configured to elastically contact the upper case 2 and the lower case 3.

In this case, as shown in FIGS. 5 and 8, each of the plurality of coupling boss parts 25 is formed to have a cylindrical shape having a screw portion formed therein and is configured to stand up in the upper case 2. That is, as shown in FIG. 8, each of the plurality of coupling boss parts 25 is formed so that an outer diameter of a base end portion positioned at the front surface-side of the upper case 2 is larger than an outward shape of a tip end portion positioned at the lower case 3-side.

Thereby, as shown in FIG. 8, each of the plurality of coupling boss parts 25 has a cylindrical shape where a step-shaped receiving portion 25a is formed on an outer peripheral surface. Also, the plurality of coupling boss parts 25 is respectively configured so that the plurality of screws 28 is respectively to be screwed through a plurality of screw insertion portions 27 provided at the lower case 3.

In this case, as shown in FIG. 8, each of the plurality of screw insertion portions 27 is formed to hang from an inner surface of the back surface-side (a right inner surface in FIG. 8) of the lower case 3 towards the back surface-side (a right side in FIG. 8) of the upper case 2. Each of the plurality of screw insertion portions 27 has a cylindrical portion 27a in which the screw 28 is to be inserted together with the head portion 28a and a contact portion 27b provided at an upper end portion (a left end portion in FIG. 8) of the cylindrical portion 27a and having an insertion hole in which the screw portion 28b of the screw 28 is to be inserted.

Thereby, as shown in FIG. 8, the plurality of coupling boss parts 25 is configured so that when the respective screw portions 28b of the plurality of screws 28 are screwed through the plurality of screw insertion portions 27 of the lower case 3, the upper case 2 and the lower case 3 are fixed to each other at a state where the upper case 2 and the lower case 3 elastically sandwich the plurality of second buffer members 26.

That is, as shown in FIG. 8, the upper case 2 and the lower case 3 are configured in such a way that when the respective screw portions 28b of the plurality of screws 28 are screwed into the plurality of coupling boss parts 25, the respective head portions 28a of the plurality of screws 28 press the respective contact portions 27b of the plurality of screw insertion portions 27 to the plurality of second buffer members 26 and the plurality of second buffer members 26 is pressed to the respective step-shaped receiving portions 25a of the plurality of coupling boss parts 25, so that the plurality of second buffer member 26 are elastically sandwiched.

In this case, as shown in FIG. 5, the plurality of coupling boss parts 25 is provided not only at four corners in the upper case 2 but also at both sides positioned at an intermediate part of the upper case 2 in the longitudinal direction. Accordingly, as shown in FIG. 8, the plurality of screw insertion portions 27 is provided at four corners of the lower case 3 and at both sides positioned at an intermediate part of the lower case 3 in the longitudinal direction, in correspondence to the plurality of coupling boss parts 25.

As shown in FIGS. 5 and 8, the plurality of second buffer members 26 is arranged at outer peripheries of the small-diameter tip end portions of the plurality of coupling boss parts 25 Each of second buffer members 26 has a substantially cylindrical shape configured to elastically contact the inner peripheral surface of the upper case 2. Each of the second buffer members 26 is configured so that an end face positioned at the front surface-side thereof is to elastically contact the step-shaped receiving portion 25a of each of the plurality of coupling boss parts 25 provided at the upper case 2, an end face positioned at the back surface-side thereof is to elastically contact the contact portion 27b provided at a lower end portion of the screw insertion portion 27 of the lower case 3 and an outer peripheral surface thereof is to elastically contact the inner peripheral surface of the upper case 2.

That is, like the first buffer member 13, the plurality of second buffer members 26 is formed to have a substantially cylindrical shape by a synthetic resin having high resiliency and hardness of about 80 to 90 such as silicon resin, elastomer or the like. The hardness is measured by a type A durometer in accordance with JIS (Japanese Industrial Standard) K 6253. As shown in FIG. 5, the plurality of second buffer members 26 is formed to conform to the inner peripheral surface of the upper case 2. In this case, each of the plurality of second buffer members 26 is formed with a protrusion 26a protruding in a direction following the inner peripheral surface of the upper case 2 and configured to elastically contact the inner peripheral surface of the upper case 2.

Also, as shown in FIGS. 5 and 8, the plurality of second buffer members 26 is configured to hold the inner case 8 arranged between the upper case 2 and the lower case 3 at a floating state. In this case, the inner case 8 is provided with first to third mounting portions 30 to 32 to which the plurality of second buffer members 26 is respectively to be mounted.

That is, as shown in FIGS. 5 and 6A, the first mounting portions 30 are provided at both sides of the upper side of the inner case 8, i.e., both sides of the upper side of the first frame 10. The second mounting portions 31 are provided at both sides of the lower side of the inner case 8, i.e., both sides of the lower side of the second frame 11 so as to protrude towards the respective coupling boss parts 25. The third mounting portions 32 are provided at both sides of the intermediate part of the inner case 8 in the longitudinal direction, i.e., at portions positioned at both sides of the coupling part 12 and the outer periphery of the battery accommodation part 15.

In this case, as shown in FIG. 5, the first mounting portions 30 provided at both sides of the upper side of the first frame 10 are formed into circular arc-shaped notched portions to which the second buffer members 26 corresponding to the first mounting portions are to be mounted. The second mounting portions 31 provided at both sides of the lower side of the second frame 11 are formed into projections that are to be bitten to the second buffer members 26 corresponding to the second mounting portions. The third mounting portions 32 provided at the portions positioned at both sides of the coupling part 12 and the outer periphery of the battery accommodation part 15 are formed into notched step portions to which the second buffer members 26 corresponding to the third mounting portions are to be mounted.

Thereby, as shown in FIGS. 5 and 8, the inner case 8 is configured in such a way that the first to third mounting portions 30 to 32 are mounted to the respective outer peripheries of the plurality of second buffer members 26, so that the inner case is arranged not to be in contact with the upper case 2 and the lower case 3 by the plurality of second buffer members 26. For this reason, the inner case 8 is configured to be held at a floating state in the device case 1.

In this case, as shown in FIGS. 5 and 8, the inner case 8 is configured so that when the device case 1 is applied with shock such as dropping and the shock is transmitted to the inner case 8 at the state where the first to third mounting portions 30 to 32 are mounted to the plurality of second buffer member 26 and are held in the device case 1, the shock in the longitudinal direction of the inner case 8, the shock in the direction perpendicular to the longitudinal direction and the shock in the thickness direction, which is a front and back surface direction, are buffered by the plurality of second buffer members 26.

Subsequently, operations of the portable terminal configured as described above are described.

When assembling the portable terminal, the inner case 8 is formed in advance and the display unit 4, the input unit 5 and the circuit board 14 are mounted to the inner case 8. That is, when forming the inner case 8, the first frame 10 and the second frame 11 and the coupling part 12 are integrally formed by a synthetic resin such as an ABS resin, a composite material of PC resin and ABS resin, or the like.

At this time, the first buffer member 13 made of a synthetic resin having resiliency such silicon resin, elastomer or the like may be integrally embedded in the coupling part 12 by two-color molding. However, it is preferably to form the coupling part 12 with the slit-shaped fitting portion 12a and to fit the first buffer member 13 in the fitting portion 12a. In this case, the first buffer member 13 is fitted in the fitting portion 12a with pushing and enlarging the fitting portion 12a in the longitudinal direction of the inner case 8.

At this state, the display unit 4 is attached to the front surface of the first frame 10 and the circuit board 14 is attached to the back surface of the first frame 10. Also, the input unit 5 is attached to the front surface of the second frame 11. Then, the inner case 8 having the display unit 4, the circuit board 14 and the input unit 5 mounted thereto is incorporated into the upper case 2 of the device case 1.

In this case, the plurality of second buffer members 26 is respectively arranged at the respective outer peripheries of the small-diameter tip end portions of the plurality of coupling boss parts 25 provided in the upper case 2, in advance. At this time, the respective end faces of the front surface-side of the plurality of second buffer members 26 are elastically contacted to the step-shaped receiving portions 25a of the plurality of coupling boss parts 25 provided at the upper case 2 and the respective outer peripheral surfaces of the plurality of second buffer members 26 are elastically contacted to the inner peripheral surface of the upper case 2.

At this state, the inner case 8 is arranged in the upper case 2. At this time, the first to third mounting portions 30 to 32 of the inner case 8 are mounted to the respective outer peripheries of the plurality of second buffer members 26. That is, the first mounting portions 30 formed into the circular arc-shaped notch portion shape at both sides of the upper side of the first frame 10 are mounted to the second buffer members 26 corresponding to the first mounting portions, so that the first mounting portions 30 are elastically contacted and held to the outer peripheries of the second buffer members 26.

Likewise, the second mounting portions 31 formed into the projection shape at both sides of the lower side of the second frame 11 are bitten to the second buffer members 26 corresponding to the second mounting portions, so that the second mounting portions 31 are elastically held to the outer peripheries of the second buffer members 26. Also, the third mounting portions 32 formed into notched step portions at the portions positioned at both sides of the coupling part 12 and both sides of the battery accommodation part 15 are mounted to the second buffer members 26 corresponding to the third mounting portions, so that the third mounting portions 32 are elastically contacted and held to the outer peripheries of the second buffer member 26.

Thereby, the first to third mounting portions 30 to 32 are mounted to the respective outer peripheries of the plurality of second buffer members 26, so that the inner case 8 is arranged not to be in contact with the upper case 2 by the plurality of second buffer members 26. For this reason, the inner case 8 is kept at a floating state in the upper case 2 at a state where the shock to be applied from the longitudinal direction of the inner case 8, the shock to be applied from the direction perpendicular to the longitudinal direction and the shock to be applied from the thickness direction, which is a front and back surface direction, are buffered by the plurality of second buffer members 26.

At this state, the display unit 4 is arranged in correspondence to the display opening 2a of the upper case 2, and the respective keys 5a of the input unit 5 are exposed outwards with being inserted into the key insertion holes 2b of the upper case 2. Also, at this time, the center trigger key 17a is exposed outwards with being inserted into the key insertion hole 2b of the upper case 2 and the side trigger keys 17b are exposed outwards with being inserted into the key insertion holes 2c of both sides of the upper case 2 positioned at both sides of the device case 1.

Then, the lower case 3 is attached to the upper case 2. At this time, the engaging protrusion 24 provided at the peripheral edge portion of the front surface-side of the lower case 3 is arranged to face the engaging groove 23 provided at the peripheral edge portion of the back surface-side of the upper case 2, the plurality of screw insertion portions 27 provided at the lower case 3 is arranged to face the plurality of coupling boss parts 25 provided at the upper case 2, and the upper case 2 and the lower case 3 are then superimposed at that state.

Thereby, the engaging protrusion 24 of the lower case 3 is fitted in the engaging groove 23 of the upper case 2, so that the upper case 2 and the lower case 3 are coupled to each other. At this state, the plurality of screws 28 is respectively inserted into the respective cylindrical portions 27a of the plurality of screw insertion portions 27 of the lower case 3, the respective screw portions 28b of the plurality of inserted screws 28 are inserted into the insertion holes of the respective contact portions 27b of the plurality of screw insertion portions 27 and the respective screw portions 28b of the plurality of inserted screws 28 are screwed and fastened to the plurality of coupling boss parts 25.

Thereby, the respective contact portions 27b of the plurality of screw insertion portions 27 of the lower case 3 are pressed and elastically contacted to the respective end faces of the back surface-side of the plurality of second buffer members 26 by the respective head portions 28a of the plurality of screws 28. In connection with this, the respective end faces of the front surface-side of the plurality of second buffer members 26 are pressed and elastically contacted to the respective step-shaped receiving portions 25a of the plurality of coupling boss parts 25 provided at the upper case 2. For this reason, the upper case 2 and the lower case 3 are fixed to each other via the plurality of second buffer members 26. As a result, the device case 1 is assembled.

At this state, the unit case 18 of the reading device 6 is attached to the back surface of the main body part 1a of the device case 1, i.e., the back surface of the lower case 3 corresponding to the main body part 1a of the device case 1 by the plurality of screws 18a. In this case, the reading unit 20 is arranged to face the reading window part 19a of the unit case 18 and the imaging unit 21 is arranged to face the imaging window part 19b of the unit case 18, and the reading unit 20 and the imaging unit 21 are mounted into the unit case 18 at that state, in advance.

Also, the battery 22 is accommodated in the battery accommodation part 15 provided at the second frame 11 of the inner case 8 corresponding to the gripping part 1b of the device case 1, and the battery accommodation part 15 provided in the gripping part 1b of the device case 1 is covered by the battery cover 7. At this state, the battery cover 7 is attached to the back surface of the lower case 3 corresponding to the gripping part 1b of the device case 1 by the screw 7a. Thereby, the portable terminal is assembled.

Subsequently, a using aspect of the portable terminal is described.

In this case, first, an operator grips the gripping part 1b of the device case 1 with a hand with the upper case 2 of the device case 1 facing upwards. At this state, since the display unit 4 and the input unit 5 of the upper case 2 face upwards, the operator can input information of goods, stocks thereof and the like by operating the diverse keys 5a of the input unit 5, and the input information is displayed on the display unit 4.

Also, when reading the code information and the image of the object to be read such as a label attached to the commercial goods by the reading device 6, the operator sets the reading window part 19a and the imaging window part 19b of the unit case 10 to face towards the object to be read and operates any one of the center trigger key 5b provided at the upper side part of the input unit 5 and the side trigger keys 5c provided at both sides of the device case 1. Thereby, the reading unit 20 of the reading device 6 reads the code information of the object to be read and the imaging unit 21 captures the object to be read, as an image, at the same time.

In this way, the code information and the image of the object to be read, which have been read by the reading device 6, are displayed on the display unit 4. For this reason, the operator operates the decision key 5a of the input unit 5 while seeing the code information and the image of the object to be read displayed on the display unit 4, so that the code information and the image of the object to be read displayed on the display unit 4 are stored.

In the meantime, when the device case 1 of the portable terminal is applied with the shock due to the dropping, for example, since the upper case 2 and the lower case 3 of the device case 1 are fixed to each other via the plurality of second buffer members 26, the shock applied to the device case 1 is buffered by the plurality of second buffer members 26.

That is, the plurality of second buffer members 26 is provided at the outer peripheries of the plurality of coupling boss parts 25 provided at the four corners in the upper case 2 and at both sides of the intermediate part of the upper case 2 in the longitudinal direction. The respective end faces of the front surface-side of the plurality of second buffer members 26 are in elastic contact with the respective step-shaped receiving portions 25a of the plurality of coupling boss parts 25 provided at the upper case 2. The respective end faces of the back surface-side of the plurality of second buffer members 26 are in elastic contact with the respective contact portions 27b of the plurality of screw insertion portions 27 of the lower case 3. Therefore, when the device case 1 is applied with the shock in the thickness direction, it is possible to securely and favorably buffer the shock in the thickness direction by the plurality of second buffer members 26.

Also, the respective outer peripheries of the plurality of second buffer member 26 are in elastic contact with the inner peripheral surface of the upper case 2 at the state where the plurality of second buffer members 26 is provided at the outer peripheries of the plurality of coupling boss parts 25.

Therefore, when the device case 1 is applied with the shock in the longitudinal direction or in the direction perpendicular to the longitudinal direction, it is possible to securely and favorably buffer the shock by the plurality of second buffer members 26. Thereby, it is possible to prevent the shock from being transmitted to the inner case 8 in the device case 1.

That is, since the plurality of second buffer members 26 is formed to have a substantially cylindrical shape conforming to the inner peripheral surface of the upper case 2 by the synthetic resin having high resiliency and hardness of about 80 to 90 such as silicon resin, elastomer or the like, it is possible to securely and favorably bring the outer peripheries thereof into elastic contact with the inner peripheral surface of the upper case 2.

In this case, the plurality of second buffer members 26 is formed with the protrusions 26a protruding in the direction following the inner peripheral surface of the upper case 2 so as to be in elastic contact with the inner peripheral surface of the upper case 2. Thereby, when the device case 1 is applied with the shock from the outside, it is possible to further securely and favorably buffer the shock by the respective protrusions 26a of the plurality of second buffer members 26.

Also, the inner case 8 arranged in the device case 1 is kept at a floating state in the device case 1 by the plurality of second buffer members 26. Therefore, even when the device case 1 is applied with the shock from the outside, the shock is buffered by the plurality of second buffer members 26, so that it is possible to prevent the shock applied to the device case 1 from being transmitted to the inner case 8. Thereby, it is possible to securely and favorably protect the components mounted on the inner case 8 such as the display unit 4, the input unit 5, the circuit board 14 and the like so that the components are not to be influenced by the shock.

That is, the inner case 8 has the first to third mounting portions 30 to 32 and the first to third mounting portions 30 to 32 are mounted to the respective outer peripheries of the plurality of second buffer members 26, so that it is possible to arrange the inner case 8 not to be in contact with the upper case 2 and the lower case 3 by the plurality of second buffer members 26. Thereby, since it is possible to hold the inner case 8 at a floating state in the device case 1, even when the device case 1 is applied with the shock from the outside, it is possible to prevent the shock from being transmitted to the inner case 8.

In this case, the first mounting portions 30 formed into the circular arc-shaped notch portion shape at both sides of the upper side of the first frame 10 are mounted to the outer peripheries of the second buffer members 26 corresponding to the first mounting portions. The second mounting portions 31 formed into the projection shape at both sides of the lower side of the second frame 11 are bitten to the second buffer members 26 corresponding to the second mounting portions. The third mounting portions 32 formed into the notched step portions at the portions positioned at both sides of the coupling part 12 and the outer periphery of the battery accommodation part 15 are mounted to the outer peripheries of the second buffer members 26 corresponding to the third mounting portions. Therefore, it is possible to securely and favorably hold the inner case 8 at a floating state in the device case 1.

That is, when the inner case 8 is held in the device case 1 with the first to third mounting portions 30 to 32 being mounted to the plurality of second buffer members 26, it is possible to securely and favorably buffer the shock to be applied from the longitudinal direction of the inner case 8, the shock to be applied from the direction perpendicular to the longitudinal direction and the shock to be applied from the thickness direction, which is a front and back surface direction of the inner case 8, by the plurality of second buffer members 26. For this reason, even when the device case 1 is applied with the shock from the outside, the shock is not transmitted to the inner case 8.

In the meantime, when the device case 1 is applied with the shock from the outside and the shock cannot be completely buffered by the plurality of second buffer members 26, the shock is transmitted to the inner case 8 in the device case 1. However, the shock transmitted to the inner case 8 is buffered by the first buffer member 13, so that it is possible to prevent the inner case 8 from being damaged due to the shock.

In this case, the first buffer member 13 is fitted to elastically push and enlarge the fitting portion 12a with being fitted in the slit-shaped fitting portion 12a of the coupling part 12 of the inner case 8 configured to couple the first frame 10 and the second frame 11. Thereby, it is possible to securely and favorably buffer the shock applied to the inner case 8 by the first buffer member 13.

That is, even when the device case 1 is applied with the shock from the outside and the shock is transmitted to the inner case 8 and is concentrated on the coupling part 12, the inner case 8 can securely and favorably buffer the shock concentrated on the coupling part 12 by the first buffer member 13. Therefore, it is possible to suppress the deterioration of the coupling part 12 due to the shock and to prevent the coupling part 12 from being damaged, thereby favorably protecting the coupling part 12.

In this case, since the heavy battery 22 is accommodated in the gripping part 1b of the device case 1, when the device case 1 is applied with the shock from the outside, the battery 22 generates the inertia force by the own weight and the shock resulting from the inertia force of the battery 22 is applied to the inner case 8. However, it is possible to securely and favorably buffer the shock due to the inertia force of the battery 22 by the first buffer member 13. For this reason, it is possible to suppress the deterioration of the coupling part 12 due to the shock of the inertia force of the battery 22, thereby preventing the coupling part 12 from being damaged.

Like this, according to the portable terminal, the inner case 8 arranged in the device case 1 has the first frame 10 arranged in the device case 1, the second frame 11 arranged in parallel with the first frame 10 in the device case 1, the coupling part 12 configured to couple the first frame 10 and the second frame 11 and the first buffer member 13 provided at the coupling part 12. Therefore, even when the device case 1 is applied with the shock from the outside and the shock is transmitted to the inner case 8, it is possible to buffer the shock by the first buffer member 13, thereby providing the portable terminal having high shock resistance.

That is, the first frame 10 and the second frame 11 have a rectangular shape, respectively, and are integrally formed with the coupling part 12 by the synthetic resin and the first buffer member 13 is embedded in the coupling part 12. Therefore, when the inner case 8 is applied with the shock in the longitudinal direction thereof, even though the shock is concentrated on the coupling part 12, the inner case 8 can securely and favorably buffer the shock to be concentrated on the coupling part 12 by the first buffer member 13 embedded in the coupling part 12.

In this case, the length of the second frame 11 in the direction perpendicular to the coupling direction in which the first frame 10 is coupled is shorter than the length of the first frame 10 in the direction perpendicular to the longitudinal direction that is the coupling direction. Thereby, when arranging the inner case 8 in the device case 1, it is possible to make a length of the main body part 1a of the device case 1, in which the first frame 10 is arranged, in the direction perpendicular to the longitudinal direction shorter than a length of the gripping part 1b of the device case 1, in which the second frame 11 is arranged, in the direction perpendicular to the longitudinal direction.

For this reason, in the inner case 8, it is possible to form the gripping part 1b of the device case 1 into a shape to be easily gripped by forming the gripping part 1b of the device case 1 smaller than the main body part 1a of the device case 1. Additionally, it is possible to make the display unit 4 great, which is to be arranged in the main body part 1a of the device case 1, by forming the main body part 1a of the device case 1 greater than the gripping part 1b of the device case 1. Thereby, it is possible to increase a screen size of the display unit 4.

In this case, the length of the coupling part 12 in the direction perpendicular to the longitudinal direction, which is the coupling direction of the first frame 10 and the second frame 11, is substantially the same as the length of the second frame 11 in the direction perpendicular to the longitudinal direction that is the coupling direction. Thereby, when the inner case 8 is applied with the shock in the longitudinal direction, it is possible to concentrate the shock on the coupling part 12, thereby favorably buffering the shock concentrated on the coupling part 12 by the first buffer member 13.

That is, the first buffer member 13 is embedded in the coupling part 12 with a length slightly smaller than the length of the coupling part 12 in the direction perpendicular to the longitudinal direction, which is the coupling direction. Thereby, when the inner case 8 is applied with the shock in the longitudinal direction thereof and the shock is concentrated on the coupling part 12, it is possible to receive the shock concentrated on the coupling part 12 by the entire first buffer member 13.

For this reason, in the inner case 8, it is possible to securely and favorably buffer the shock concentrated on the coupling part 12 by the first buffer member 13. Therefore, it is possible to favorably suppress the deterioration of the coupling part 12 due to the shock and to prevent the coupling part 12 from being damaged, thereby securely and favorably protecting the coupling part 12 and obtaining the coupling part 12 having high shock resistance.

In this case, the coupling part 12 is formed with the slit-shaped fitting portion 12a, which is configured to fit therein the first buffer member 13 and has the length slightly smaller than the length of the second frame 11 in the direction perpendicular to the longitudinal direction, and the first buffer member 13 is fitted in the slit-shaped fitting portion 12a with elastically pushing and enlarging the fitting portion 12a. Thereby, it is possible to securely and favorably buffer the shock concentrated on the coupling part 12 by the entire first buffer member 13.

Also, when a weight of a component mounted to the second frame 11 is heavier than a weight of a component mounted to the first frame 10 and the inner case 8 is thus applied with the shock, even though the component mounted to the second frame 11 generates the inertia force by the own weight and the shock resulting from the inertia force of the component mounted to the second frame 11 is applied to the inner case 8, it is possible to securely and favorably buffer the shock due to the inertia force by the first buffer member 13.

In this case, the second frame 11 is mounted with the heavy battery 22, which is a battery, and the first frame 10 is mounted with a light component such as the display unit 4, the circuit board 14 and the like, which is a display module. Thereby, when the device case 1 is applied with the shock, the battery 22 generates the inertia force by the own weight and the shock resulting from the inertia force of the battery 22 is applied to the inner case 8, it is possible to securely and favorably buffer the shock due to the inertia force by the first buffer member 13.

Meanwhile, in the above embodiment, the coupling part 12 of the inner case 8 is formed to have the substantially same length as the length of the second frame 11 in the direction perpendicular to the longitudinal direction. However, the present invention is not limited. For example, like a modified embodiment shown in FIGS. 9A to 10B, a coupling part 35 may be formed.

That is, as shown in FIGS. 9A to 10B, the length of the coupling part 35 of the modified embodiment in the direction perpendicular to the longitudinal directions of the first frame 10 and the second frame 11 gradually decreases from both side end portions of the first frame 10 in the direction perpendicular to the longitudinal direction towards both side end portions of the second frame 11 in the direction perpendicular to the longitudinal direction.

That is, both sides of the coupling part 35 of the modified embodiment are formed into a curved part or an inclined part so as to be gradually narrowed from both side end portions of the first frame 10 towards both side end portions of the second frame 11. In this case, the coupling part 35 is formed with a slit-shaped fitting portion 35a, which is configured to fit therein the first buffer member 13, has a length equal to or slightly greater than the length of the second frame 11 in the direction perpendicular to the longitudinal direction and penetrates the front and back surfaces.

For this reason, the first buffer member 13 is configured to be fitted in the slit-shaped fitting portion 35a, which is formed to have the length equal to or slightly greater than the length of the second frame 11 in the direction perpendicular to the longitudinal direction and is provided at the coupling part 35, with penetrating in the front and back surface direction. That is, the first buffer member 13 is fitted to elastically push and enlarge the fitting portion 35a with being fitted in the slit-shaped fitting portion 35a of the coupling part 35.

In the inner case 8, like the above embodiment, when the device case 1 is applied with the shock from the outside and the shock is transmitted to the inner case 8, it is possible to buffer the shock to be concentrated on the coupling part 35 by the first buffer member 13 and to protect the coupling part 35. In addition, since both sides of the coupling part 35 are formed into a curved part or an inclined part so as to be gradually narrowed from both side end portions of the first frame 10 towards both side end portions of the second frame 11, it is possible to increase the strength of the coupling part 35, as compared to the above embodiment, so that it is possible to suppress the deterioration of the coupling part 35 due to the shock to be concentrated on the coupling part 35 and to prevent the coupling part 35 from being damaged.

Also, in the above embodiment, the coupling boss parts 25 and the second buffer members 26 are provided in the upper case 2. However, the present invention is not limited thereto. For example, the coupling boss parts 25 and the second buffer members 26 may be provided in the lower case 3 and the screw insertion hole portions may be provided in the upper case 2.

Also, in the above embodiment and the modified embodiment, the present invention is applied to the portable terminal. However, it is not necessarily required to apply the present invention to the portable terminal. For example, the present invention can be applied to a portable device such as a mobile phone, a portable information processing device and the like.

Although the embodiment of the present invention has been described, the present invention is not limited thereto and is intended to include the inventions defined in the claims and the equivalent range.

The present invention may be configured as follows:
(1) A portable device comprising:
a device case, and
an inner case arranged in the device case,
wherein the inner case comprises:
a first frame arranged in the device case,
a second frame arranged in parallel with the first frame in the device case,
a coupling part configured to couple the first frame and the second frame, and
a buffer member provided to the coupling part and configured to buffer shock to be applied to the first frame and the second frame.
(2) The portable device according to (1), wherein the first frame and the second frame have a rectangular shape respectively and are formed integrally with the coupling part.
(3) The portable device according to (1), wherein a length of the second frame in a direction perpendicular to a coupling direction of the first frame and the second frame is coupled is smaller than a length of the first frame in the direction perpendicular to the coupling direction.
(4) The portable device according to (3), wherein a length of the coupling part in the direction perpendicular to the coupling direction is substantially the same as the length of the second frame in the direction perpendicular to the coupling direction.
(5) The portable device according to (3), wherein a length of the coupling part in the direction perpendicular to the coupling direction gradually decreases from both side end portions of the first frame in the direction perpendicular to the coupling direction towards both side end portions of the second frame in the direction perpendicular to the coupling direction.
(6) The portable device according to (1), wherein the second frame is mounted with a component of which a weight is heavier than a weight of a component mounted to the first frame.
(7) The portable device according to (1), wherein the second frame is mounted with a battery and the first frame is mounted with a display module.
(8) The portable device according to (1), wherein the inner case is formed of a first synthetic resin.
(9) The portable device according to (8), wherein the first synthetic resin is an ABS resin or a composite material of PC resin and ABS resin.
(10) The portable device according to (8), wherein the buffer member is formed of a second synthetic resin having higher resiliency than the first synthetic resin.
(11) The portable device according to (10), wherein the second synthetic resin is a silicon resin or elastomer.
(12) The portable device according to (1), wherein the coupling part has a slit-shaped fitting portion and the buffer member is fitted in the fitting portion.
(13) The portable device according to (12), wherein the buffer member is fitted in the fitting portion with pushing and enlarging the fitting portion in the coupling direction of the first frame and the second frame.
(14) The portable device according to (12), wherein the fitting portion is formed as a concave groove, which does not penetrate in a front and back surface direction of the inner case and has a rectangular section.
(15) The portable device according to (14), wherein a rear wall part of the fitting portion is formed to be thinner than a thickness of a rear wall part of the first frame or a thickness of a rear wall part of the second frame.
(16) The portable device according to (12), wherein the fitting portion is formed as an opening, which penetrates in a front and back surface direction of the inner case and has a rectangular section.
(17) A portable device comprising:
an inner case of which first frame-shaped frame part and a second frame-shaped frame part are provided so that openings thereof are aligned in the same plane, and
a buffer member provided in a gap between the first frame-shaped frame part and the second frame-shaped frame part,
wherein the inner case is formed so that the second frame-shaped frame part is coupled to the first frame-shaped frame part in a region corresponding to the gap by a coupling part formed to be thinner than a thickness of the first frame-shaped frame part or a thickness of the second frame-shaped frame part, and
wherein the buffer member is arranged to be accommodated within the thickness of the first frame-shaped frame part or the thickness of the second frame-shaped frame part in a thickness direction of the inner case.

The invention claimed is:
1. A portable device comprising:
a device case, and
an inner case arranged in the device case, wherein the inner case comprises:
a first frame arranged in the device case;
a second frame arranged in parallel with the first frame in the device case in a depth direction of the inner case;
a coupling member configured to couple the first frame and the second frame at a top of the first frame in the depth direction of the inner case so that a gap is formed between the first frame and the second frame; and
a buffer member arranged to be fitted in the gap to fill the gap.
2. The portable device according to claim 1,
wherein the first frame and the second frame have a rectangular shape respectively and are formed integrally with the coupling member.
3. The portable device according to claim 1,
wherein a length of the second frame in a direction perpendicular to a coupling direction of the first frame and the second frame is coupled is smaller than a length of the first frame in the direction perpendicular to the coupling direction.
4. The portable device according to claim 3,
wherein a length of the coupling member in the direction perpendicular to the coupling direction is substantially the same as the length of the second frame in the direction perpendicular to the coupling direction.
5. The portable device according to claim 3,
wherein a length of the coupling member in the direction perpendicular to the coupling direction gradually decreases from both side end portions of the first frame in the direction perpendicular to the coupling direction towards both side end portions of the second frame in the direction perpendicular to the coupling direction.

6. The portable device according to claim 1, wherein the second frame is mounted with a component of which a weight is heavier than a weight of a component mounted to the first frame.

7. The portable device according to claim 1, wherein the second frame is mounted with a battery and the first frame is mounted with a display module.

8. The portable device according to claim 1, wherein the first frame, the second frame and the coupling member are formed of a first synthetic resin.

9. The portable device according to claim 8, wherein the first synthetic resin is an ABS resin or a composite material of PC resin and ABS resin.

10. The portable device according to claim 8, wherein the buffer member is formed of a second synthetic resin having higher resiliency than the first synthetic resin.

11. The portable device according to claim 10, wherein the second synthetic resin is a silicon resin or elastomer.

12. The portable device according to claim 1, wherein the coupling member has a slit-shaped fitting portion formed in a direction perpendicular to a coupling direction of the first frame and the second frame, and
wherein the slit-shaped fitting portion defines the gap.

13. The portable device according to claim 1, wherein the buffer member is fitted in the gap so as to be pressed against the coupling member from a bottom side of the inner case.

14. The portable device according to claim 1, wherein the second frame is formed to be deeper than the first frame, and the second frame is coupled to the first frame by the coupling member so that a top of the second frame is higher than the top of the first frame in the depth direction of the inner case.

15. A portable device comprising:
an inner case of which first frame-shaped frame part and a second frame-shaped frame part are provided so that openings thereof are aligned in the same plane,
a coupling member is formed to be thinner than a depth of the first frame-shaped frame part and a depth of the second frame-shaped frame part,
 wherein the coupling member is configured to couple the first frame-shaped frame part and the second frame-shaped frame part at a top of the first frame-shaped frame part in a depth direction of the inner case so that a gap is formed between the first frame-shaped frame part and the second frame-shaped frame part, and
a buffer member arranged to be fitted in the gap to fill the gap.

16. The portable device according to claim 1, wherein the buffer member is in contact with a side surface of the first frame and a side surface of the second frame.

17. The portable device according to claim 1, wherein the buffer member is configured to buffer shock to be applied to the first frame and the second frame.

18. The portable device according to claim 1, wherein an end portion of the buffer member at bottom side is located at a bottom of the second frame in the depth direction of the inner case.

* * * * *